(12) United States Patent
Kobayashi et al.

(10) Patent No.: US 10,493,915 B2
(45) Date of Patent: Dec. 3, 2019

(54) ABNORMALITY DETECTION APPARATUS AND NOTIFICATION APPARATUS

(71) Applicant: Rohm Co., Ltd., Kyoto (JP)

(72) Inventors: Tadashi Kobayashi, Kyoto (JP); Masafumi Seike, Kyoto (JP); Atsushi Momota, Kyoto (JP); Hideki Nishiyama, Kyoto (JP)

(73) Assignee: Rohm Co., Ltd., Kyoto (JP)

( * ) Notice: Subject to any disclaimer, the term of this patent is extended or adjusted under 35 U.S.C. 154(b) by 0 days.

(21) Appl. No.: 16/095,794

(22) PCT Filed: May 12, 2017

(86) PCT No.: PCT/JP2017/018001
§ 371 (c)(1),
(2) Date: Oct. 23, 2018

(87) PCT Pub. No.: WO2017/204005
PCT Pub. Date: Nov. 30, 2017

(65) Prior Publication Data
US 2019/0126822 A1  May 2, 2019

(30) Foreign Application Priority Data

May 24, 2016 (JP) .................................. 2016-103280

(51) Int. Cl.
*B60Q 11/00* (2006.01)
*H05B 37/03* (2006.01)
(Continued)

(52) U.S. Cl.
CPC .............. *B60Q 11/005* (2013.01); *B60Q 1/04* (2013.01); *B60Q 11/00* (2013.01);
(Continued)

(58) Field of Classification Search
None
See application file for complete search history.

(56) References Cited

U.S. PATENT DOCUMENTS 6,490,512 B1 * 12/2002 Niggemann ........... B60Q 11/00
340/458
8,002,440 B2 * 8/2011 Lan ..................... F21V 23/0442
362/249.02
(Continued)

FOREIGN PATENT DOCUMENTS

JP         03-211426        9/1991
JP         2001-338782     12/2001
(Continued)

OTHER PUBLICATIONS

Japan Patent Office, International Search Report for PCT/JP2017/018001 dated Jun. 27, 2017.

*Primary Examiner* — Vibol Tan
(74) *Attorney, Agent, or Firm* — Fish & Richardson P.C.

(57) ABSTRACT

An abnormality detection apparatus (100) is configured to detect an abnormality of a lighting device (200). The abnormality detection apparatus (100) includes an illuminance sensor (110), a memory (120) and a controller (130). The controller (130) is configured to detect the abnormality of the lighting device (200) based on a criterion stored in the memory (120) and a difference between an illuminance detected by the illuminance sensor (110) during on state of the lighting device (200) and an illuminance detected by the illuminance sensor (110) during off state of the lighting device (200).

9 Claims, 12 Drawing Sheets

(51) Int. Cl.
*B60Q 1/04* (2006.01)
*H05B 33/08* (2006.01)

(52) U.S. Cl.
CPC ......... *H05B 33/0893* (2013.01); *H05B 37/03* (2013.01); *Y02B 20/42* (2013.01); *Y02B 20/44* (2013.01)

(56) References Cited

U.S. PATENT DOCUMENTS

| | | | | |
|---|---|---|---|---|
| 2009/0097244 | A1* | 4/2009 | Lan | F21V 23/0442 |
| | | | | 362/234 |
| 2016/0245471 | A1* | 8/2016 | Nakazato | F21S 41/14 |
| 2017/0201445 | A1* | 7/2017 | Chaudhry | H04L 43/0876 |
| 2017/0265258 | A1* | 9/2017 | Hurley | H05B 33/0869 |
| 2017/0289511 | A1* | 10/2017 | Usami | H04N 9/3194 |

FOREIGN PATENT DOCUMENTS

| | | |
|---|---|---|
| JP | 2007-265287 | 10/2007 |
| JP | 2009-252394 | 10/2009 |
| JP | 2010-200985 | 9/2010 |
| JP | 2012-113909 | 6/2012 |
| JP | 2012-177576 | 9/2012 |
| JP | 2016-58240 | 4/2016 |

\* cited by examiner

ABNORMALITY DETECTION APPARATUS AND NOTIFICATION APPARATUS

TECHNICAL FIELD

The present invention relates to an abnormality detection apparatus and a notification apparatus, and particularly to an abnormality detection apparatus and a notification apparatus configured to detect an abnormality of a lighting device.

BACKGROUND ART

There are various lighting devices in the world, such as an illumination device for a house and a headlight for a vehicle. Detection of an abnormality of these lighting devices is performed mainly by human visual checking. However, it is difficult to recognize, by human visual checking, a subtle change in light during on state of a lighting device. Therefore, it is difficult to detect an abnormality of the lighting device by human visual checking before the lighting device breaks down, and thus, it is also difficult to replace the lighting device before the lighting device breaks down.

Japanese Patent Laying-Open No. 2007-265287 (PTL 1) discloses a monitoring system configured to detect an abnormality of an LED (Light Emitting Diode) illumination device. The monitoring system includes a camera and an LED illumination device. According to the monitoring system, an abnormality of the LED illumination device can be detected by recognizing a luminance of a particular character pattern photographed with the camera when the LED illumination device emits light.

CITATION LIST

Patent Literature

PTL 1: Japanese Patent Laying-Open No. 2007-265287

SUMMARY OF INVENTION

Technical Problem

In the monitoring system disclosed in PTL 1 above, photographing with the camera for detecting an abnormality of the lighting device (LED illumination device) is performed during the nighttime. Therefore, a luminance of an image taken with the camera depends mainly on light of the lighting device, and an influence of light (e.g., solar light) other than the light of the lighting device is relatively small.

However, detection of an abnormality of the lighting device is not always performed in a particular time range. Depending on the time range and the surrounding environment, the influence of the light other than the light of the lighting device may be great. In this case, it may be impossible in some cases to accurately detect an abnormality of the lighting device by using the method disclosed in PTL 1 above.

The present invention has been made to solve the above-described problem and an object thereof is to provide an abnormality detection apparatus and a notification apparatus capable of detecting an abnormality of a lighting device regardless of the time range and the surrounding environment.

Solution to Problem

An abnormality detection apparatus according to an aspect of the present invention is configured to detect an abnormality of a lighting device. The abnormality detection apparatus includes: a sensor; a memory; and a control device. The sensor is configured to detect a physical quantity about the lighting device. The memory is configured to store a criterion for detecting the abnormality of the lighting device. The control device is configured to detect the abnormality of the lighting device based on the criterion and a difference between a physical quantity detected by the sensor during on state of the lighting device and a physical quantity detected by the sensor during off state of the lighting device.

The difference between the physical quantity detected by the sensor during on state of the lighting device and the physical quantity detected by the sensor during off state of the lighting device corresponds to a value obtained by removing an influence of light other than light of the lighting device from the physical quantity detected by the sensor during on state of the lighting device. That is, the abnormality detection apparatus detects the abnormality of the lighting device in accordance with the value obtained by removing the influence of the light other than the light of the lighting device. Therefore, according to the abnormality detection apparatus, the influence of the light other than the light of the lighting device can be reduced with regard to detection of the abnormality of the lighting device, and thus, the abnormality of the lighting device can be detected regardless of the time range and the surrounding environment.

Preferably, in the abnormality detection apparatus, the sensor is configured to continuously detect the physical quantity during on state of the lighting device. The control device is configured to detect the abnormality of the lighting device based on a difference between a physical quantity detected by the sensor when the lighting device is turned on and each physical quantity continuously detected by the sensor during on state of the lighting device.

More preferably, in the abnormality detection apparatus, the control device is configured to detect the abnormality of the lighting device, when the difference between the physical quantity detected by the sensor when the lighting device is turned on and each physical quantity continuously detected by the sensor during on state of the lighting device exceeds a first prescribed value.

In the abnormality detection apparatus, the abnormality of the lighting device is detected when once the difference between the physical quantity detected by the sensor when the lighting device is turned on and each physical quantity continuously detected by the sensor during on state of the lighting device exceeds the first prescribed value. Therefore, according to the abnormality detection apparatus, the abnormality of the lighting device can be detected if there is the slightest doubt about the abnormality of the lighting device.

More preferably, in the abnormality detection apparatus, the control device is configured to detect the abnormality of the lighting device, when a frequency exceeds a prescribed frequency, the frequency being a frequency with which the difference between the physical quantity detected by the sensor when the lighting device is turned on and each physical quantity continuously detected by the sensor during on state of the lighting device exceeds a first prescribed value.

In the abnormality detection apparatus, the abnormality of the lighting device is not detected when once the difference between the physical quantity detected by the sensor when the lighting device is turned on and each physical quantity continuously detected by the sensor during on state of the lighting device exceeds the first prescribed value, but the abnormality of the lighting device is detected for the first time when the frequency with which the difference exceeds the first prescribed value exceeds the prescribed frequency. Therefore, according to the abnormality detection apparatus, the abnormality of the lighting device can be detected after the possibility of the lighting device having an abnormality increases.

Preferably, in the abnormality detection apparatus, the sensor is an illuminance sensor, and the physical quantity is an illuminance.

Preferably, in the abnormality detection apparatus, the sensor is a color sensor, and the physical quantity is color information.

An abnormality detection apparatus according to another aspect of the present invention is configured to detect an abnormality of a lighting device. The abnormality detection apparatus includes: an illuminance sensor; a color sensor; and a control device. The illuminance sensor is configured to detect an illuminance of the lighting device. The color sensor is configured to detect an illuminance and color information of the lighting device. The control device is configured to detect the abnormality of the lighting device based on the illuminance detected by the illuminance sensor or the color information detected by the color sensor. The control device is configured to determine that the illuminance sensor or the color sensor is abnormal, when a difference between the illuminance detected by the illuminance sensor and the illuminance detected by the color sensor exceeds a second prescribed value.

When the abnormality of the lighting device is detected using the illuminance sensor or the color sensor, the abnormality of the lighting device cannot be accurately detected if the illuminance sensor or the color sensor has an abnormality. If the illuminance sensor or the color sensor is normal, the illuminance detected by the illuminance sensor and the illuminance detected by the color sensor should be almost the same. In the abnormality detection apparatus, it is determined that the illuminance sensor or the color sensor is abnormal, when the difference between the illuminance detected by the illuminance sensor and the illuminance detected by the color sensor exceeds the second prescribed value. Therefore, according to the abnormality detection apparatus, the abnormality of the illuminance sensor or the color sensor can be detected, and as a result, the abnormality of the lighting device can be accurately detected.

Advantageous Effects of Invention

According to the present invention, there can be provided an abnormality detection apparatus and a notification apparatus capable of detecting an abnormality of a lighting device regardless of the time range and the surrounding environment.

BRIEF DESCRIPTION OF DRAWINGS

FIG. 3 shows a change in illuminance while the lighting device stays on.

DESCRIPTION OF EMBODIMENTS

Figure 1:
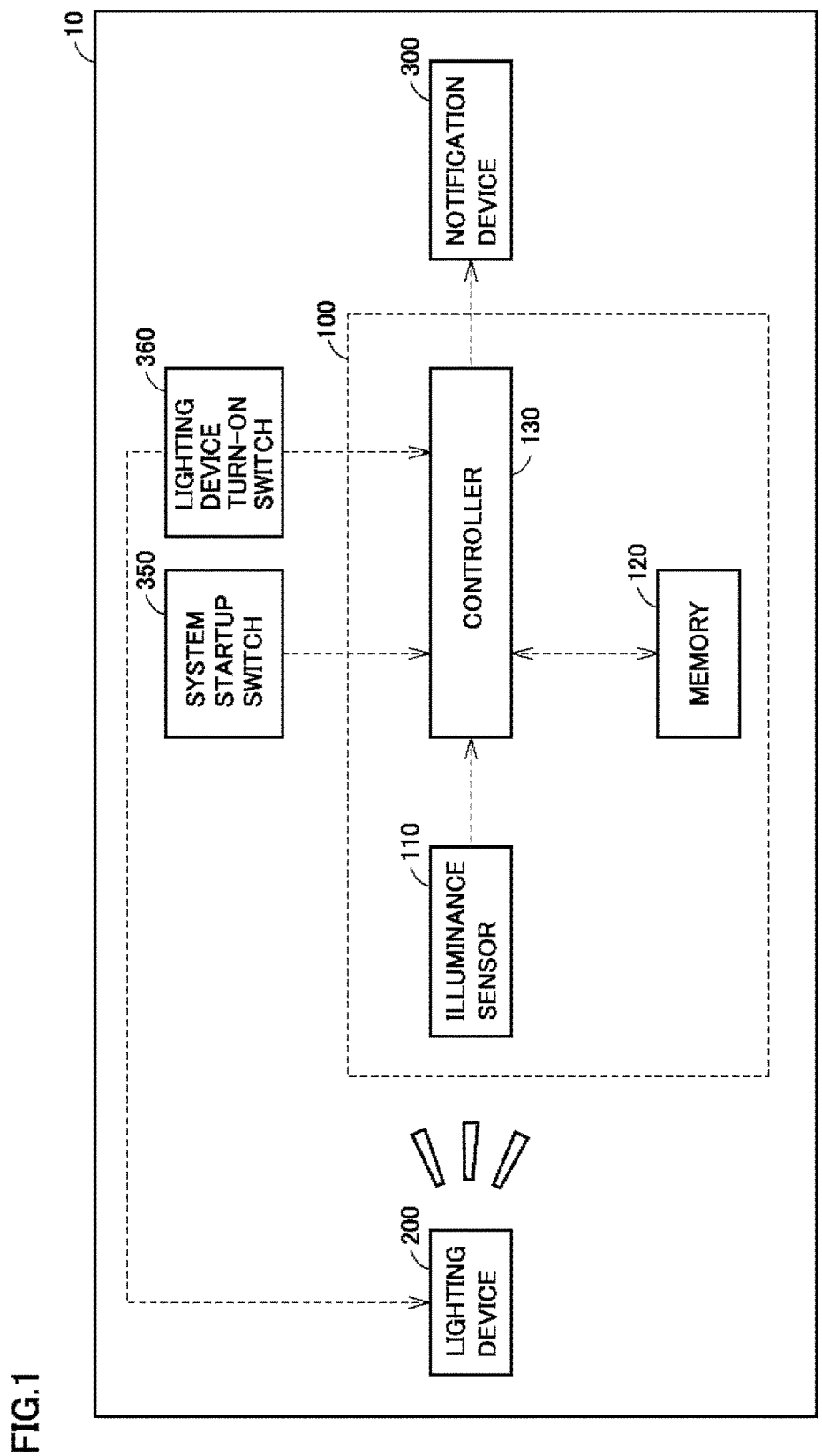
FIG. 1 is an overall configuration diagram of an abnormality detection system to which an abnormality detection apparatus according to a first embodiment is applied.

Embodiments of the present invention will be described in detail hereinafter with reference to the drawings. While a plurality of embodiments will be described below, it has been originally intended to combine the configurations described in the embodiments as appropriate. In the drawings, the same or corresponding portions are denoted by the same reference characters and description thereof will not be repeated.

First Embodiment

[Overall Configuration of Abnormality Detection System]

FIG. 1 is an overall configuration diagram of an abnormality notification system to which an abnormality detection apparatus according to a first embodiment is applied. Referring to FIG. 1, an abnormality notification system 10 includes an abnormality detection apparatus 100, a lighting device 200, a notification device 300, a system startup switch 350, and a lighting device turn-on switch 360.

In abnormality notification system 10, an abnormality of lighting device 200 is detected by abnormality detection apparatus 100. When an abnormality of lighting device 200 is detected, abnormality detection apparatus 100 controls notification device 300 so as to provide a notification for urging a user to replace or repair lighting device 200. According to abnormality notification system 10, the user can recognize the necessity to replace or repair lighting device 200, before lighting device 200 breaks down.

Lighting device 200 is a light source that is supplied with electric power from a not-shown power supply and emits light. Lighting device 200 is, for example, an LED illumination device, a headlight for a vehicle, or the like.

Notification device 300 provides a notification for urging the user to replace or repair lighting device 200. When an abnormality of lighting device 200 is detected by abnormality detection apparatus 100, notification device 300 receives a command from abnormality detection apparatus 100 and provides the above-described notification. Notification device 300 is, for example, a display or a speaker. For example, in the case where notification device 300 is a display, an image for urging the user to replace or repair lighting device 200 is displayed on the display when lighting device 200 is abnormal.

System startup switch 350 is a switch for starting or stopping abnormality notification system 10. By operating system startup switch 350, the user can start or stop abnormality notification system 10. System startup switch 350 may be, for example, a push-type switch or a slide-type switch. For example, when abnormality notification system 10 is a vehicle, system startup switch 350 may be a start switch or an ignition key of the vehicle.

Lighting device turn-on switch 360 is a switch for turning on or off lighting device 200. By operating lighting device turn-on switch 360, the user can turn on or off lighting device 200. Lighting device turn-on switch 360 may be, for example, a push-type switch or a slide-type switch.

Abnormality detection apparatus 100 includes an illuminance sensor 110, a memory 120 and a controller 130.

Illuminance sensor 110 detects an illuminance (one example of a physical quantity about lighting device 200) of lighting device 200. Illuminance sensor 110 is arranged at a position where illuminance sensor 110 can receive light of lighting device 200.

Memory 120 stores a reference illuminance (one example of a reference quantity) used as a criterion for detecting an abnormality of lighting device 200. The reference illuminance will be described in detail below. Memory 120 is, for example, a nonvolatile memory such as a flash memory.

Controller 130 detects an abnormality of lighting device 200 based on the illuminance of lighting device 200 detected by illuminance sensor 110 and the reference illuminance stored in memory 120. A method for detecting an abnormality of lighting device 200 by controller 130 will be described in detail below.

[Detection of Abnormality of Lighting Device Independent of Time Range and Surrounding Environment]

In abnormality notification system 10 configured as described above, illuminance sensor 110 receives not only light emitted from lighting device 200 but also external light such as solar light. Therefore, the illuminance detected by illuminance sensor 110 is an illuminance resulting from the light of lighting device 200 and the external light. If detection of an abnormality of lighting device 200 is always performed under the situation in which the brightness of the external light is almost the same, an abnormality of lighting device 200 can be detected simply by monitoring the illuminance detected by illuminance sensor 110.

However, detection of an abnormality of lighting device 200 is not always performed under the situation in which the brightness of the external light is the same. Depending on the time range and the surrounding environment, an influence of the external light may be great. In this case, an abnormality of lighting device 200 cannot be detected simply by monitoring the illuminance detected by illuminance sensor 110.

Accordingly, in abnormality detection apparatus 100 according to the first embodiment, controller 130 detects an abnormality of lighting device 200 based on the reference illuminance and a difference between an illuminance detected by illuminance sensor 110 during on state of lighting device 200 and an illuminance detected by illuminance sensor 110 during off state of lighting device 200. More specifically, controller 130 detects an abnormality of lighting device 200 when the difference between the illuminance detected by illuminance sensor 110 during on state of lighting device 200 and the illuminance detected by illuminance sensor 110 during off state of lighting device 200 falls below the reference illuminance. A value of 80% of an illuminance when lighting device 200 is new (no influence of the external light) is, for example, set as the reference illuminance.

The difference between the illuminance detected by illuminance sensor 110 during on state of lighting device 200 and the illuminance detected by illuminance sensor 110 during off state of lighting device 200 corresponds to a value obtained by removing the influence of the light other than the light of lighting device 200 from the illuminance detected by illuminance sensor 110 during on state of lighting device 200. That is, in abnormality detection apparatus 100, an abnormality of lighting device 200 is detected when the value obtained by removing the influence of the light other than the light of lighting device 200 falls below the reference illuminance. Therefore, according to abnormality detection apparatus 100, the influence of the light other than the light of lighting device 200 can be reduced with regard to detection of an abnormality of lighting device 200, and thus, an abnormality of lighting device 200 can be detected regardless of the time range and the surrounding environment.

[Process Procedure for Detecting Abnormality of Lighting Device]

Figure 2:
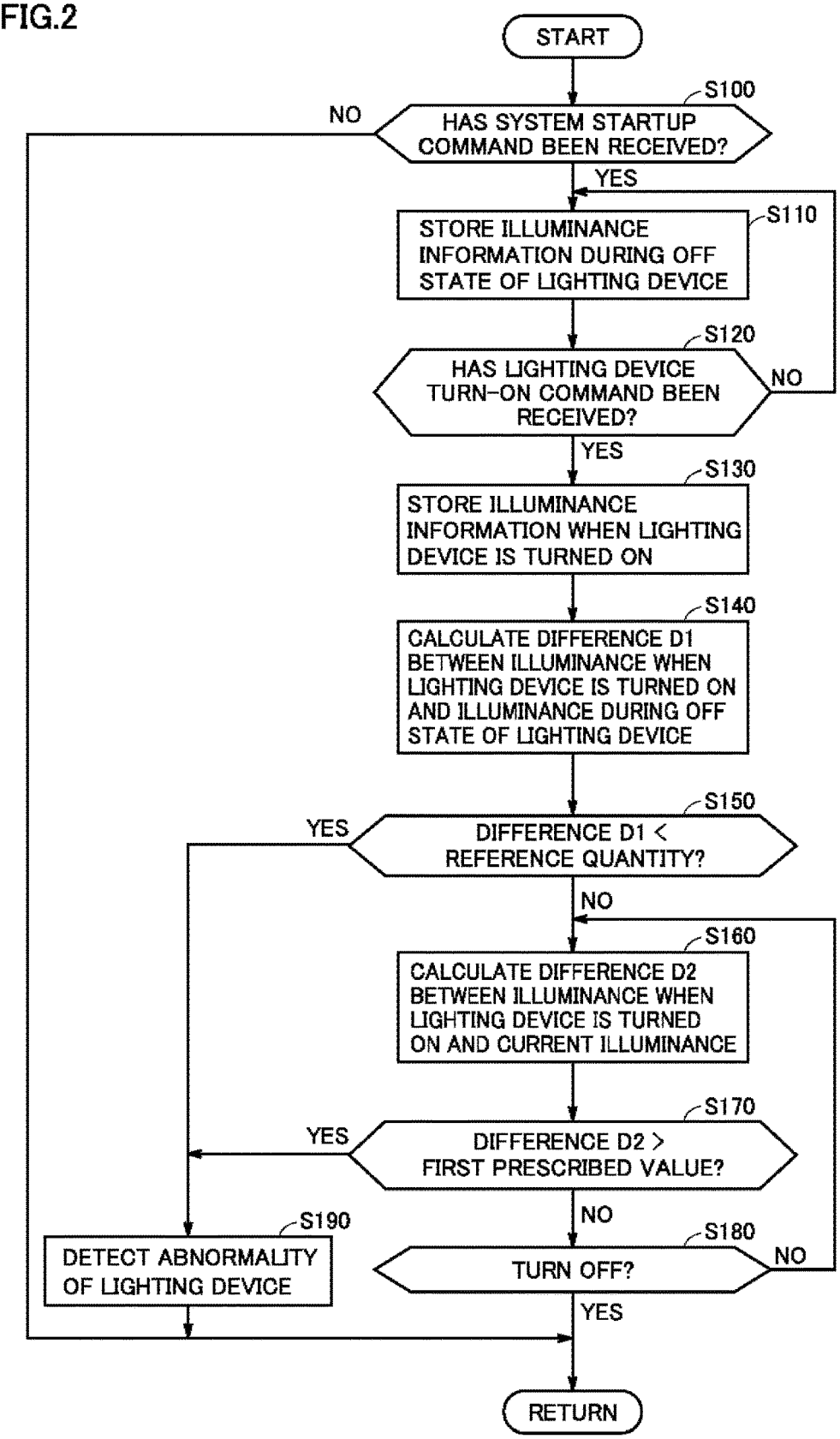
FIG. 2 is a flowchart showing a process procedure for detecting an abnormality of a lighting device.

FIG. 2 is a flowchart showing a process procedure for detecting an abnormality of lighting device 200. Referring to FIG. 2, the process shown in this flowchart is invoked from the not-shown main routine and repeatedly executed in controller 130 during operation of abnormality notification system 10.

Controller 130 determines whether or not controller 130 has received a command to start abnormality notification system 10 from the user through system startup switch 350 (step S100). A block of controller 130 that receives the command to start abnormality notification system 10 is operating even if abnormality notification system 10 is not operating.

When it is determined that controller 130 has not received the command to start abnormality notification system 10 (NO in step S100), the process is returned to the main routine. On the other hand, when it is determined that controller 130 has received the command to start abnormality notification system 10 (YES in step S100), controller 130 causes memory 120 to store sensor data (illuminance information) detected by illuminance sensor 110 during off state of lighting device 200 (step S110). As described above, the sensor data is used to remove the influence of the light other than the light of lighting device 200 included in the sensor data of illuminance sensor 110 during on state of lighting device 200.

Thereafter, controller 130 determines whether or not controller 130 has received a command to turn on lighting device 200 from the user through lighting device turn-on switch 360 (step S120). When it is determined that controller 130 has not received the command to turn on lighting device 200 (NO in step S120), the process proceeds to step S110 again and controller 130 updates the sensor data during off state of lighting device 200 that is stored in memory 120.

On the other hand, when it is determined that controller 130 has received the command to turn on lighting device 200 (YES in step S120), controller 130 causes memory 120 to store illuminance information detected by illuminance sensor 110 when lighting device 200 is turned on (immediately after lighting device 200 is turned on) (step S130). The timing of causing the memory to store the illuminance information (the time when lighting device 200 is turned on) does not necessarily need to be immediately after lighting device 200 is turned on, and may be, for example, after a prescribed time period elapses from the time when lighting device 200 is turned on.

Thereafter, by accessing memory 120, controller 130 calculates a difference D1 between the illuminance detected by illuminance sensor 110 when lighting device 200 is turned on and the illuminance detected by illuminance sensor 110 during off state of lighting device 200 (step S140). Specifically, controller 130 performs calculation for subtracting the illuminance during off state of lighting device 200 from the illuminance when lighting device 200 is turned on. Difference D1 corresponds to a value obtained by removing the influence of the light other than the light of lighting device 200 from the sensor data of illuminance sensor 110 during on state of lighting device 200.

When difference D1 is calculated, controller 130 determines whether or not difference D1 is smaller than the reference quantity (reference illuminance) stored in memory 120 (step S150). As described above, the reference illuminance is, for example, a value of 80% of the illuminance when lighting device 200 is new (no influence of the external light). That is, in step S150, it is determined whether or not the illuminance of lighting device 200 decreases by a prescribed quantity or more from the illuminance when lighting device 200 is new.

When it is determined that calculated difference D1 is smaller than the reference illuminance (YES in step S150), there is a high possibility that the time of breakdown of lighting device 200 approaches, and thus, controller 130 detects an abnormality of lighting device 200 and outputs an abnormality detection signal to notification device 300 (step S190). The process in notification device 300 after notification device 300 receives the abnormality detection signal will be described in detail below.

On the other hand, when it is determined that calculated difference D1 is equal to or greater than the reference illuminance (NO in step S150), there is a high possibility that lighting device 200 does not have an abnormality at least immediately after lighting device 200 is turned on. In this case, in order to perform abnormality detection even when an abnormality occurs in lighting device 200 while lighting device 200 stays on afterwards, controller 130 repeatedly executes the processing in steps S160 to S180 until lighting device 200 is turned off.

That is, controller 130 first calculates a difference D2 (absolute value) between the illuminance detected by illuminance sensor 110 when lighting device 200 is turned on and an illuminance currently detected by illuminance sensor 110 (step S160). Specifically, controller 130 calculates an absolute value of the difference between the illuminance when lighting device 200 is turned on and the current illuminance. Thereafter, controller 130 determines whether or not difference D2 calculated in step S160 has exceeded a first prescribed value (step S170). The purpose of the processing in steps S160 and S170 will be described next.

Figure 3:
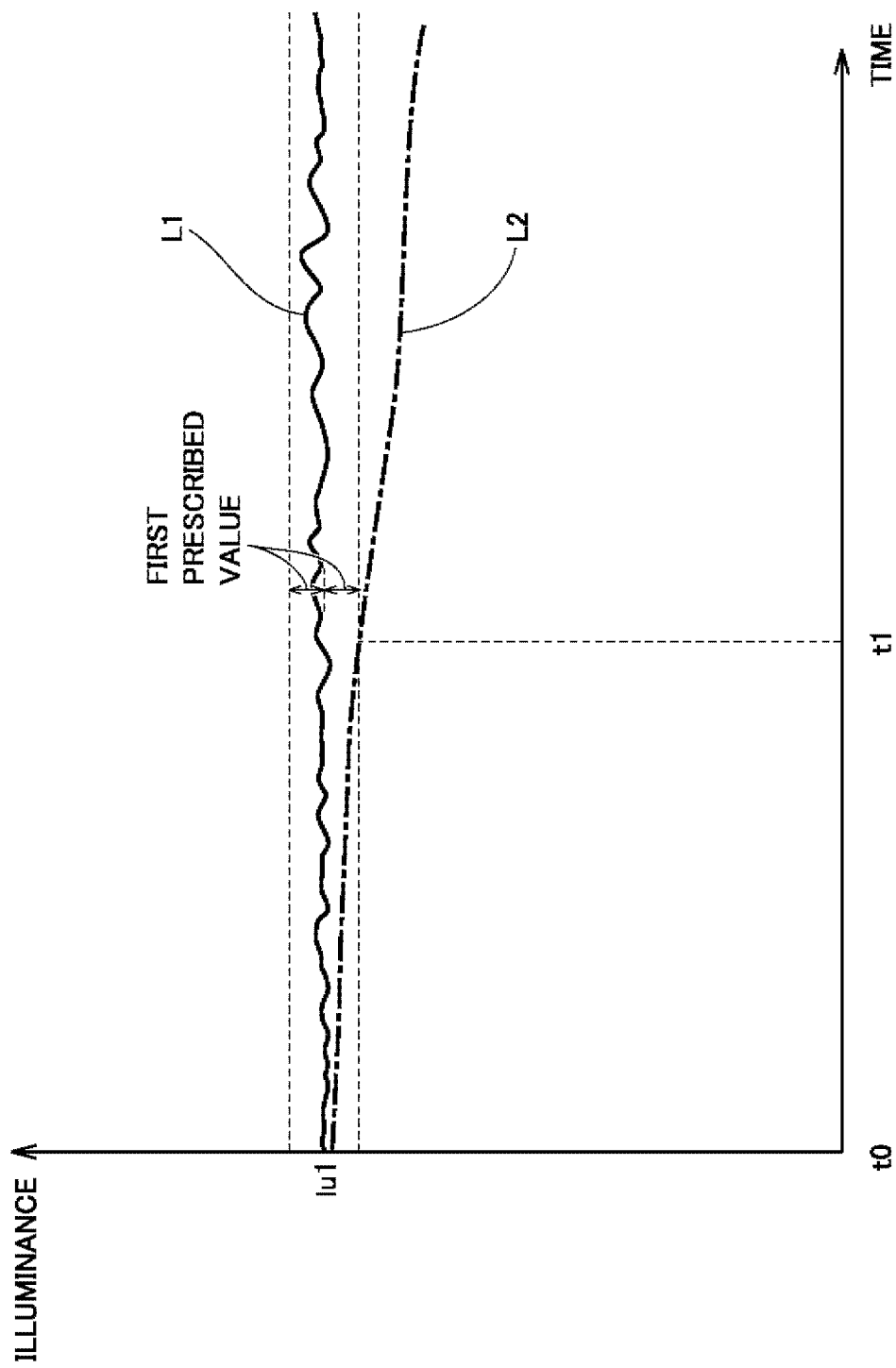

FIG. 3 shows a change in illuminance while lighting device 200 stays on. Referring to FIG. 3, the horizontal axis represents the time and the vertical axis represents the illuminance of lighting device 200. An illuminance change L1 indicated by a solid line represents a change in illuminance when lighting device 200 is normal. On the other hand, an illuminance change L2 indicated by an alternate long and short dash line represents a change in illuminance when an abnormality is detected during on state of lighting device 200. At time t0 which is the time when lighting device 200 is turned on, the illuminance of lighting device 200 is lu1 in both L1 and L2.

As can be seen from illuminance change L1, the illuminance of lighting device 200 fluctuates to some extent due to noise, even when lighting device 200 is normal. In the first embodiment, when a quantity of fluctuation in illuminance of lighting device 200 from the time when lighting device 200 is turned on exceeds the first prescribed value, an abnormality of lighting device 200 is detected, because the fluctuation in illuminance is not considered to be caused simply by the noise. A value that prevents the fluctuation in illuminance caused by the noise from being mistakenly detected as an abnormality of lighting device 200 is predetermined as the first prescribed value. Information indicating the first prescribed value is stored in, for example, memory 120. At time t1, difference D2 between the illuminance indicated by illuminance change L2 and the illuminance (lu1) when lighting device 200 is turned on exceeds the first prescribed value. As a result, an abnormality of lighting device 200 is detected. That is, according to abnormality detection apparatus 100, an abnormality of lighting device 200 can be detected simply by monitoring the change in illuminance during on state of lighting device 200.

Figure 4:
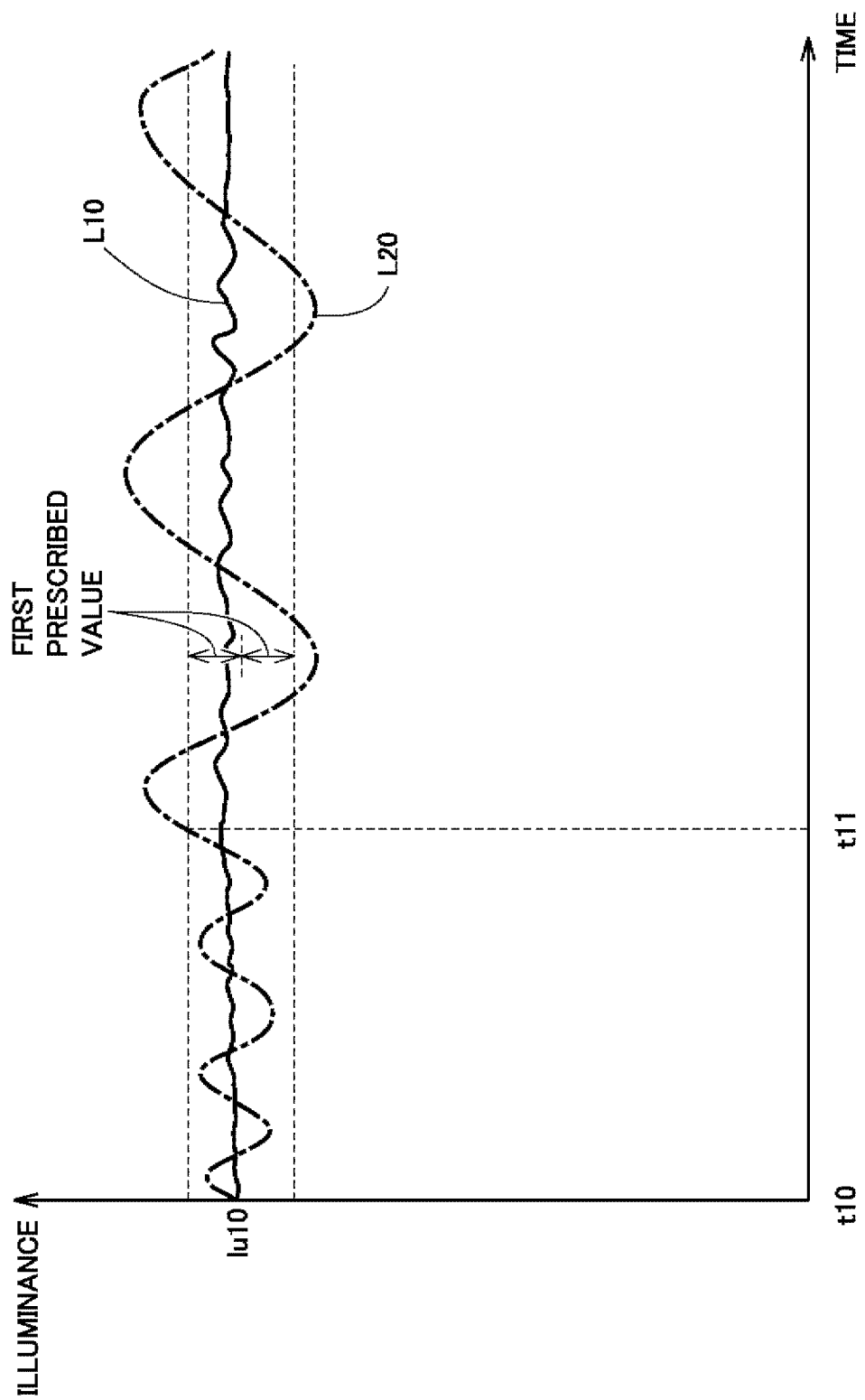
FIG. 4 shows another example of a change in illuminance when an abnormality of the lighting device is detected.

The change in illuminance of lighting device 200 when an abnormality of lighting device 200 is detected is not limited to the example in which the illuminance gradually decreases with the passage of time as shown in FIG. 3. FIG. 4 shows another example of a change in illuminance when an abnormality of lighting device 200 is detected. Referring to FIG. 4, the horizontal axis represents the time and the vertical axis represents the illuminance of lighting device 200. An illuminance change L10 indicated by a solid line represents a change in illuminance when lighting device 200 is normal. On the other hand, an illuminance change L20 indicated by an alternate long and short dash line represents a change in illuminance when an abnormality is detected during on state of lighting device 200. As compared with illuminance change L10, illuminance change L20 changes greatly in amplitude. At time t10 which is the time when lighting device 200 is turned on, the illuminance of lighting device 200 is lu10 in both L10 and L20. Then, at time t11, difference D2 between the illuminance indicated by illuminance change L20 and the illuminance (lu10) when lighting device 200 is turned on exceeds the first prescribed value. Therefore, an abnormality of lighting device 200 is detected at time t11.

Referring again to FIG. 2, when it is determined in step S170 that difference D2 (calculated in step S160) has exceeded the first prescribed value (YES in step S170), there is a high possibility that the time of breakdown of lighting device 200 approaches, and thus, controller 130 detects an abnormality of lighting device 200 and outputs an abnormality detection signal to notification device 300 (step S190).

On the other hand, when it is determined that difference D2 is equal to or smaller than the first prescribed value (NO in step S170), controller 130 determines whether or not lighting device 200 has been turned off (step S180). When it is determined that lighting device 200 has not been turned off (NO in step S180), the process proceeds to step S160 again. On the other hand, when it is determined that lighting device 200 has been turned off (YES in step S180), the process is returned to the main routine.

As described above, in abnormality detection apparatus 100 according to the first embodiment, controller 130 detects an abnormality of lighting device 200 when difference D1 between the illuminance (one example of a physical quantity) detected by illuminance sensor 110 during on state of lighting device 200 and the illuminance detected by illuminance sensor 110 during off state of lighting device 200 falls below the reference illuminance (one example of a criterion). According to abnormality detection apparatus 100, an abnormality of lighting device 200 can be detected regardless of the time range and the surrounding environment.

In addition, in abnormality detection apparatus 100 according to the first embodiment, controller 130 detects an abnormality of lighting device 200 based on difference D2 between the illuminance (one example of a physical quantity) detected by illuminance sensor 110 when lighting device 200 is turned on and the illuminance continuously detected by illuminance sensor 110 during on state of lighting device 200. According to abnormality detection apparatus 100, an abnormality of lighting device 200 can be detected simply by monitoring the change in illuminance during on state of lighting device 200.

[Notification Process Procedure]

Figure 5:
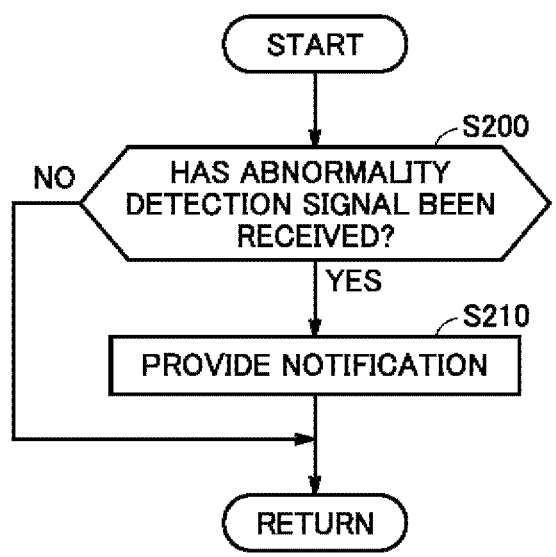
FIG. 5 is a flowchart showing a notification process procedure by a notification device.

FIG. 5 is a flowchart showing a notification process procedure by notification device 300. Referring to FIG. 5, the process shown in this flowchart is invoked from the not-shown main routine and repeatedly executed in notification device 300 (for example, when notification device 300 is a display, a controller included in the display) during operation of abnormality notification system 10.

Notification device 300 determines whether or not notification device 300 has received the abnormality detection signal from controller 130 (step S200). When it is determined that notification device 300 has not received the abnormality detection signal (NO in step S200), the process returns to the main routine. On the other hand, when it is determined that notification device 300 has received the abnormality detection signal (YES in step S200), notification device 300 provides a notification for urging the user to replace or repair lighting device 200 (step S210). For example, when notification device 300 is a display, an image for urging the user to replace or repair lighting device 200 is displayed on the display. Thereafter, the process returns to the main routine.

As described above, in abnormality notification system 10 according to the first embodiment, the data obtained by removing the influence of the external light is used to detect an abnormality of lighting device 200, and thus, abnormality detection apparatus 100 can detect an abnormality of lighting device 200 regardless of the time range and the surrounding environment, and appropriately urge the user to replace or repair lighting device 200.

Modification of First Embodiment

In the first embodiment, in steps S170 and S190 in FIG. 2, an abnormality of lighting device 200 is detected when once the difference between the illuminance when lighting device 200 is turned on and the current illuminance exceeds the first prescribed value. Thus, in abnormality notification system 10 according to the first embodiment, an abnormality of lighting device 200 can be detected if there is the slightest doubt about an abnormality of lighting device 200.

In a modification of the first embodiment, an abnormality of lighting device 200 is not detected when once the difference between the illuminance when lighting device 200 is turned on and the current illuminance exceeds the first prescribed value, but an abnormality of lighting device 200 is detected when a frequency with which the difference exceeds the first prescribed value exceeds a prescribed frequency. In abnormality detection apparatus 100 according to the present modification, an abnormality of lighting device 200 is not detected when once the difference exceeds the first prescribed value, and thus, an abnormality of lighting device 200 can be detected after the possibility of lighting device 200 having an abnormality increases. In addition, false detection due to noise and the like can also be prevented.

Figure 6:
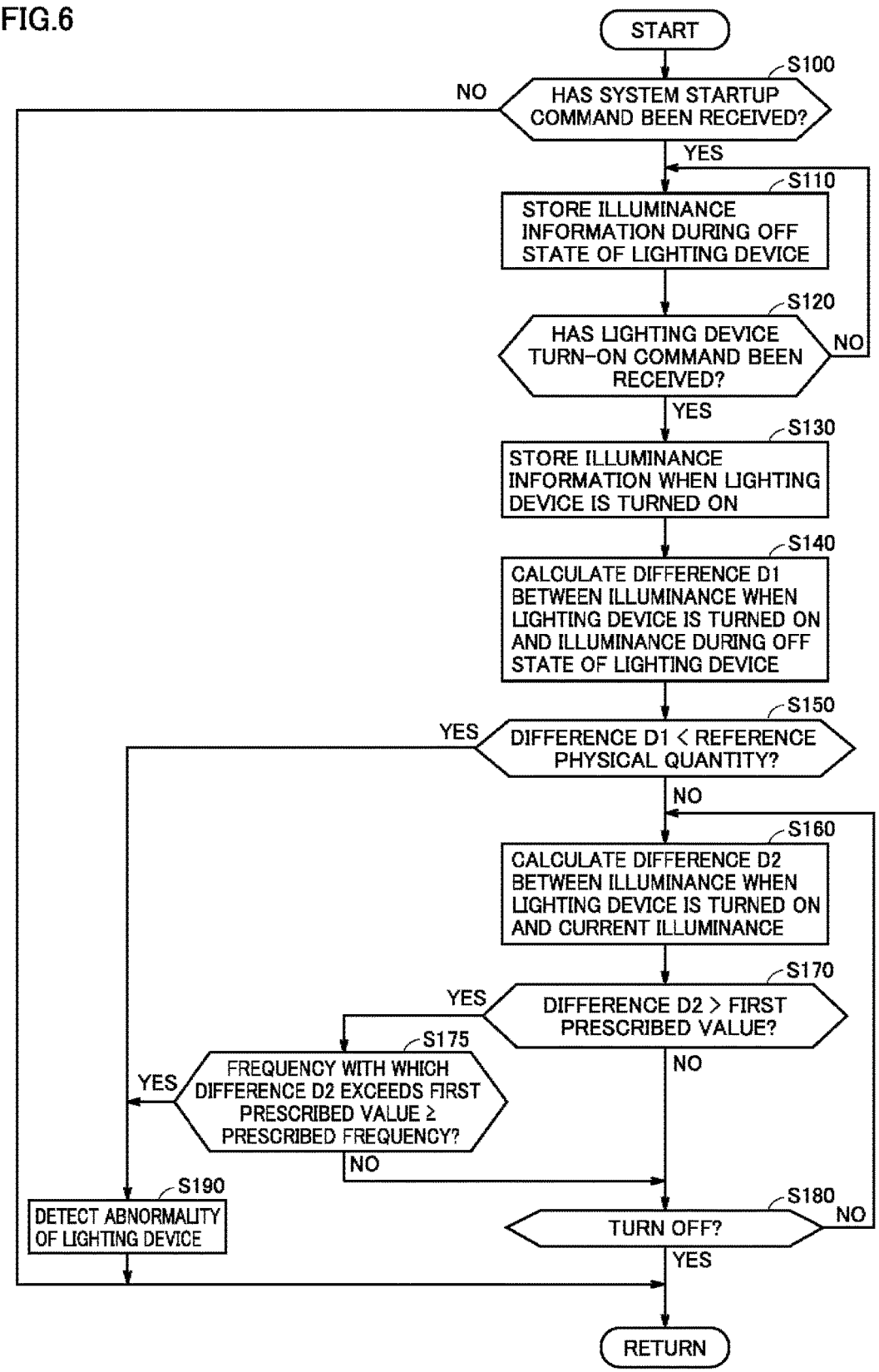
FIG. 6 is a flowchart showing a process procedure for detecting an abnormality of a lighting device in a modification of the first embodiment.

FIG. 6 is a flowchart showing a process procedure for detecting an abnormality of lighting device 200 in the modification of the first embodiment. Referring to FIG. 6, this flowchart is configured by adding the processing in step S175 to the flowchart in FIG. 2. A difference from the first embodiment will now be described mainly. The process in the flowchart shown in FIG. 6 is invoked from the not-shown main routine and repeatedly executed in controller 130 during operation of abnormality notification system 10.

When it is determined in step S170 that difference D2 between the illuminance detected by illuminance sensor 110 when lighting device 200 is turned on and the illuminance currently detected by illuminance sensor 110 has exceeded the first prescribed value (YES in step S170), controller 130 determines whether or not a frequency with which difference D2 exceeds the first prescribed value is equal to or higher than a prescribed frequency (step S175). For example, controller 130 determines whether or not the number of times that difference D2 exceeds the first prescribed value in several latest cycles is equal to or larger than the prescribed number of times.

When it is determined that the frequency with which difference D2 exceeds the first prescribed value is equal to or higher than the prescribed frequency (YES in step S175), controller 130 detects an abnormality of lighting device 200 and outputs an abnormality detection signal to notification device 300 (step S190). On the other hand, when it is determined that the frequency with which difference D2 exceeds the first prescribed value is less than the prescribed frequency (NO in step S175), the process proceeds to step S180.

In abnormality detection apparatus 100 according to the present modification, an abnormality of lighting device 200 is not detected when once difference D2 exceeds the first prescribed value, but an abnormality of lighting device 200 is detected only when the frequency with which difference D2 exceeds the first prescribed value becomes equal to or higher than the prescribed frequency. Therefore, in abnormality detection apparatus 100 according to the present modification, an abnormality of lighting device 200 can be detected after the possibility of lighting device 200 having an abnormality increases.

Second Embodiment

In the first embodiment, the example of using the illuminance detected by illuminance sensor 110 as a physical quantity has been described. In a second embodiment, the example of detecting an abnormality of lighting device 200 by using color information detected by a color sensor 110A as a physical quantity will be described.

[Overall Configuration of Abnormality Detection System]

Figure 7:
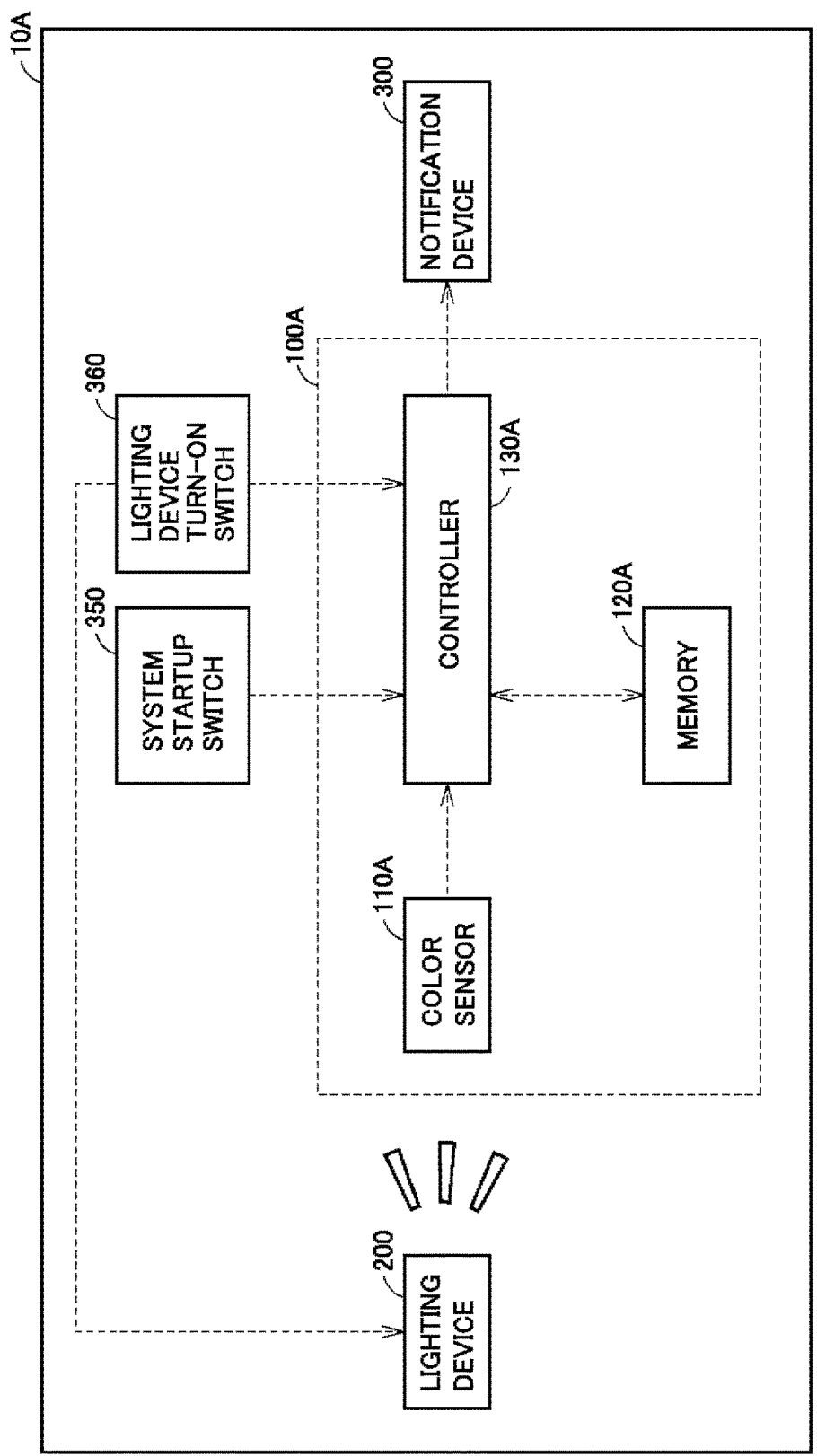
FIG. 7 is an overall configuration diagram of an abnormality detection system to which an abnormality detection apparatus according to a second embodiment is applied.

FIG. 7 is an overall configuration diagram of an abnormality detection system to which an abnormality detection apparatus according to the second embodiment is applied. Referring to FIG. 7, an abnormality notification system 10A includes an abnormality detection apparatus 100A instead of abnormality detection apparatus 100 in the first embodiment. The remaining configuration is similar to that of the first embodiment.

Abnormality detection apparatus 100A detects an abnormality of lighting device 200. Abnormality detection apparatus 100A includes color sensor 110A, a memory 120A and a controller 130A.

Color sensor 110A detects color information (one example of a physical quantity about lighting device 200) of light emitted from lighting device 200. Color sensor 110A can also detect an illuminance of lighting device 200. The color information detected by color sensor 110A is expressed using, for example, coordinate information in an L*a*b* color system. Color sensor 110A is arranged at a position where color sensor 110A can receive the light of lighting device 200.

Memory 120A stores a reference distance (one example of a criterion) used as a criterion for detecting an abnormality of lighting device 200. For example, when the color information is expressed using the coordinate information in the L*a*b* color system, a value of 80% of a distance (color difference) between a coordinate when new lighting device 200 is turned on and a coordinate when new lighting device 200 is turned off is, for example, set as the reference distance. Similarly to the reference illuminance in the first embodiment, the reference distance is used to remove the influence of the light other than the light of lighting device 200A from sensor data of color sensor 110A. Memory 120A is, for example, a nonvolatile memory such as a flash memory.

Controller 130A detects an abnormality of lighting device 200 based on the color information of the light of lighting device 200 detected by color sensor 110A and the reference distance stored in memory 120A.

[Detection of Abnormality of Lighting Device Using Color Sensor]

Figure 8:
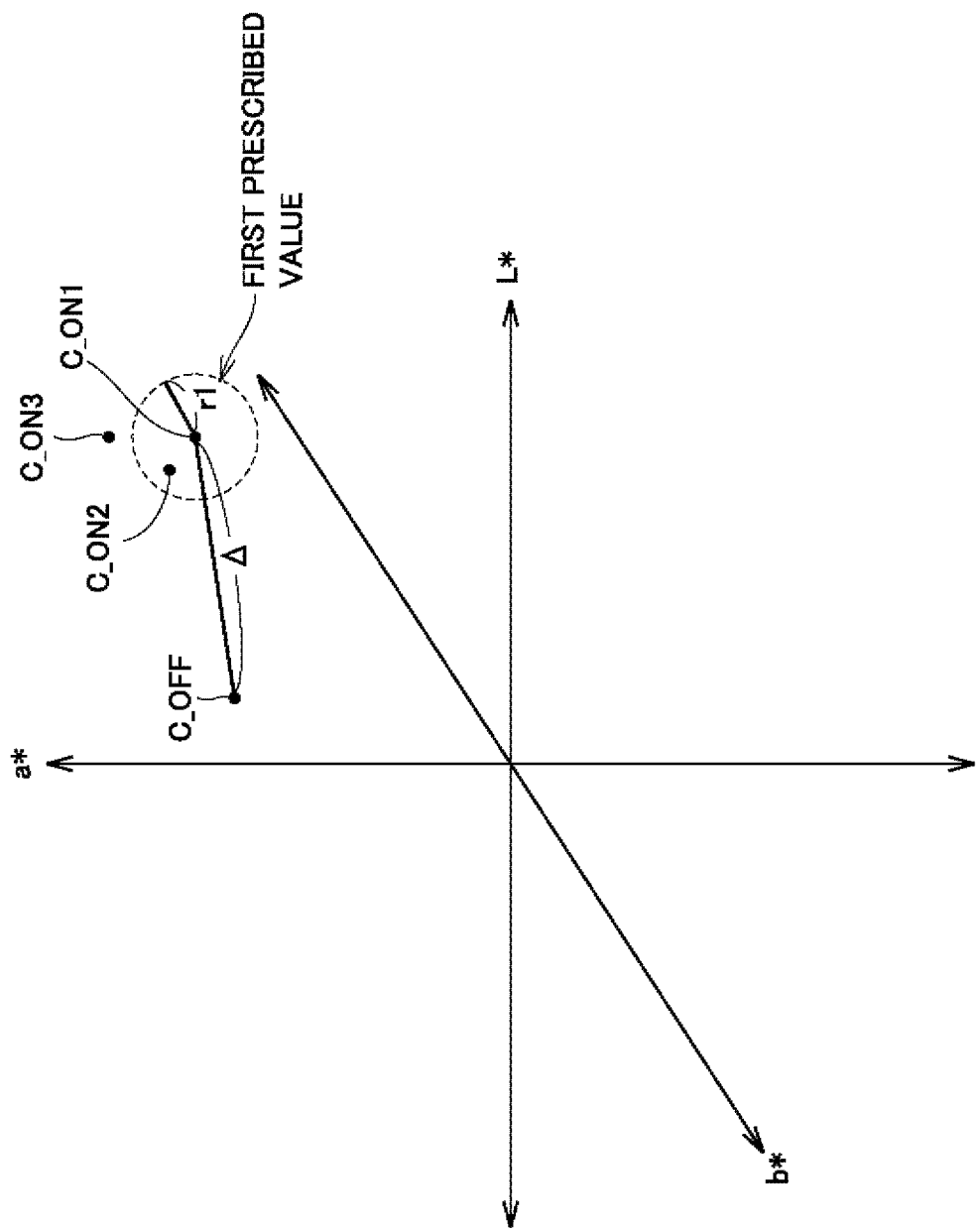
FIG. 8 shows a coordinate space of an L*a*b* color system.

FIG. 8 shows a coordinate space of the L*a*b* color system. Referring to FIG. 8, the L* axis represents lightness, and the a* axis and the b* axis represent chromaticity (hue and chroma). A coordinate C_OFF is one example of a coordinate indicated by color information detected by color sensor 110A during off state of lighting device 200. A coordinate C_ON1 is one example of a coordinate indicated by color information detected by color sensor 110A when lighting device 200 is turned on (immediately after lighting device 200 is turned on). Coordinates C_ON2 and C_ON3 are one example of coordinates indicated by color information detected by color sensor 110A while lighting device 200 stays on.

In abnormality detection apparatus 100A according to the second embodiment, in order to detect an abnormality of lighting device 200, a distance A between the coordinate (C_ON1) indicated by the color information detected by color sensor 110A when lighting device 200 is turned on and the coordinate (C_OFF) indicated by the color information detected by color sensor 110A during off state of lighting device 200 is calculated. Distance A can also be regarded, for example, as an absolute value of a difference between a vector indicated by the color information detected by color sensor 110A when lighting device 200 is turned on and a vector indicated by the color information detected by color sensor 110A during off state of lighting device 200. Calculated distance A corresponds to a value obtained by removing the influence of the light other than the light of lighting device 200 from the sensor data of color sensor 110A during on state of lighting device 200.

In the second embodiment, an abnormality of lighting device 200 is detected when calculated distance A does not fall within a reference range (reference distance±α). That is, in the second embodiment, an abnormality of lighting device 200 is detected when the color of the light emitted from lighting device 200 when lighting device 200 is turned on changes by a prescribed quantity or more from the color of the light when lighting device 200 is new.

According to abnormality detection apparatus 100A, the influence of the light other than the light of lighting device 200 can be reduced with regard to detection of an abnormality of lighting device 200, and thus, an abnormality of lighting device 200 can be detected regardless of the time range and the surrounding environment, similarly to abnormality detection apparatus 100 according to the first embodiment.

In addition, in abnormality detection apparatus 100A, it is determined whether or not the coordinate (C_ON2 or C_ON3) indicated by the color information detected by color sensor 110A during on state of lighting device 200 is present in a sphere having a radius r1 and centered at the coordinate (C_ON1) indicated by the color information detected by color sensor 110A when lighting device 200 is turned on. That is, in abnormality detection apparatus 100A, it is determined whether or not the color of the light when lighting device 200 is turned on and the current color of the light have a prescribed degree of similarity. The purpose of this is to perform abnormality detection even when an abnormality occurs in lighting device 200 while lighting device 200 stays on.

Similarly to the illuminance of lighting device 200 in the first embodiment, even when lighting device 200 is normal, the coordinate indicated by the color information of lighting device 200 fluctuates to some extent due to noise. In the second embodiment, when the distance (distance r) between the coordinate (C_ON1) indicated by the color information detected by color sensor 110A when lighting device 200 is turned on and the coordinate (C_ON2 or C_ON3) indicated by the color information currently detected by color sensor 110A exceeds a first prescribed value (distance r1) (when distance r is not present in the sphere having radius r1), an abnormality of lighting device 200 is detected, because the fluctuation in coordinate is not considered to be caused simply by the noise. A value that prevents the fluctuation in coordinate caused by the noise from being mistakenly detected as an abnormality of lighting device 200 is predetermined as the first prescribed value. Information indicating the first prescribed value is prestored in, for example, memory 120A. The first prescribed value is different from the first prescribed value in the first embodiment.

For example, when the coordinate indicated by the color information currently detected by color sensor 110A is C_ON2, the distance between coordinate C_ON1 and coordinate C_ON2 is smaller than the first prescribed value (distance r1), and thus, an abnormality of lighting device 200 is not detected. On the other hand, when the coordinate indicated by the color information currently detected by color sensor 110A is C_ON3, the distance between coordinate C_ON1 and coordinate C_ON3 exceeds the first prescribed value (distance r1), and thus, an abnormality of lighting device 200 is detected. That is, according to abnormality detection apparatus 100A, an abnormality of lighting device 200 can be detected simply by monitoring a change in color information during on state of lighting device 200.

[Process Procedure for Detecting Abnormality of Lighting Device]

Figure 9:
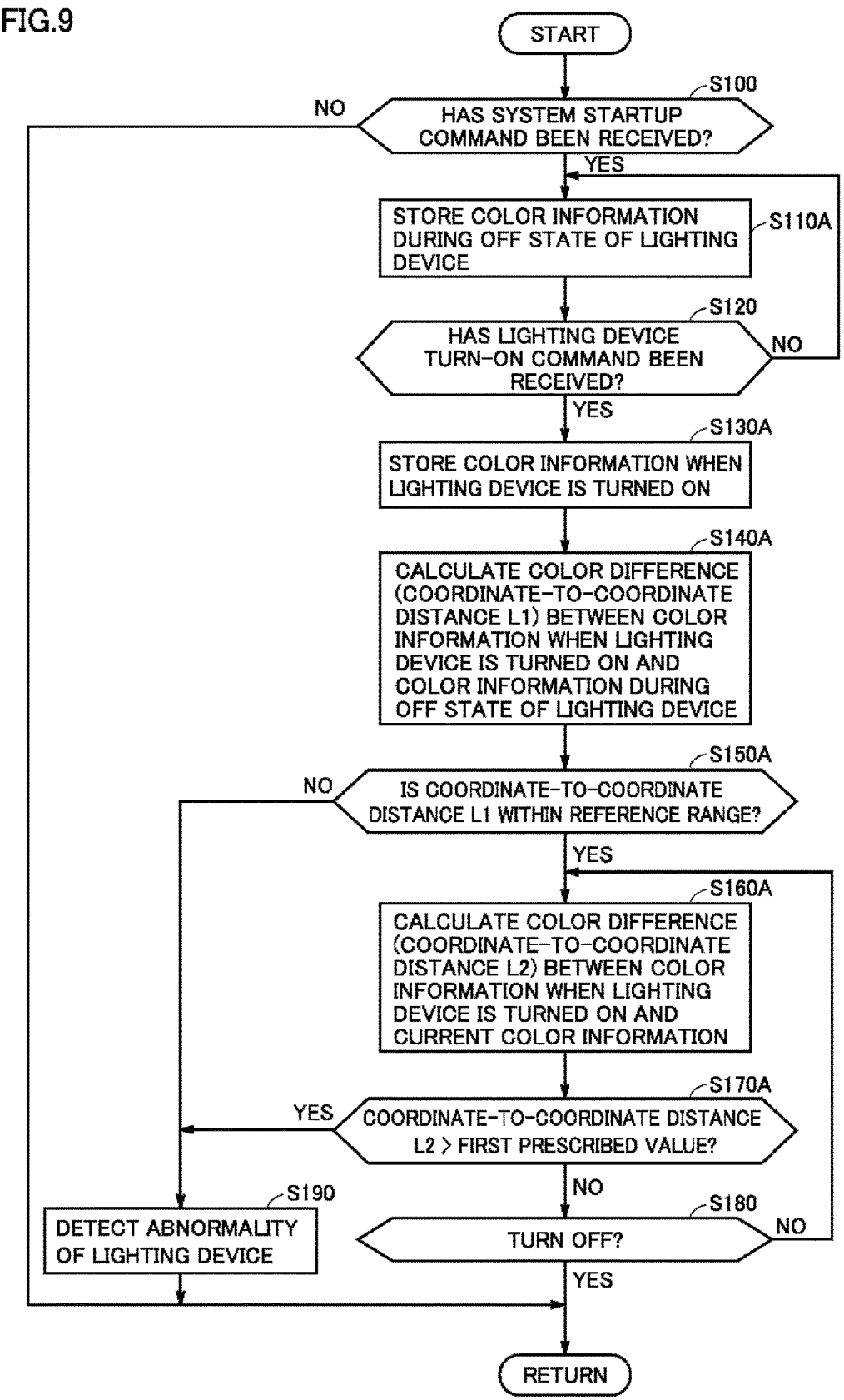
FIG. 9 is a flowchart showing a process procedure for detecting an abnormality of a lighting device.

FIG. 9 is a flowchart showing a process procedure for detecting an abnormality of lighting device 200 in the second embodiment. Referring to FIG. 9, a part of the steps in this flowchart are common to those in the flowchart shown in FIG. 2. In the second embodiment, steps S110A, S130A to S170A are executed instead of steps S110 and S130 to S170 in FIG. 2 executed in the first embodiment. A difference from the first embodiment will now be described mainly. The process in the flowchart shown in FIG. 9 is invoked from the not-shown main routine and repeatedly executed in controller 130A during operation of abnormality notification system 10A.

When it is determined in step S100 that controller 130A has received the command to start abnormality notification system 10A (YES in step S100), controller 130A causes memory 120A to store the sensor data (color information expressed using the coordinate information in the L*a*b* color system) detected by color sensor 110A during off state of lighting device 200 (step S110A).

Thereafter, when it is determined in step S120 that controller 130A has not received the command to turn on lighting device 200 (NO in step S120), the process proceeds to step S110A again and controller 130A updates the sensor data during off state of lighting device 200 that is stored in memory 120A. On the other hand, when it is determined in step S120 that controller 130A has received the command to turn on lighting device 200 (YES in step S120), controller 130A causes memory 120A to store the color information detected by color sensor 110A when lighting device 200 is turned on (step S130A).

Then, by accessing memory 120A, controller 130A calculates a color difference (coordinate-to-coordinate distance L1 in the L*a*b* color system) between the color information detected by color sensor 110A when lighting device 200 is turned on and the color information detected by color sensor 110A during off state of lighting device 200 (step S140A). When coordinate-to-coordinate distance L1 is calculated, controller 130A determines whether or not coordinate-to-coordinate distance L1 falls within the reference range stored in memory 120A (step S150A).

When it is determined that coordinate-to-coordinate distance L1 does not fall within the reference range (NO in step S150A), controller 130A detects an abnormality of lighting device 200 and outputs an abnormality detection signal to notification device 300 (step S190). On the other hand, when it is determined that coordinate-to-coordinate distance L1 falls within the reference range (YES in step S150A), controller 130A calculates a color difference (coordinate-to-coordinate distance L2) between the color information detected by color sensor 110A when lighting device 200 is turned on and the color information currently detected by color sensor 110A, in order to continuously detect the occurrence of an abnormality of lighting device 200 during on state of lighting device 200 (step S160A).

Thereafter, controller 130A determines whether or not coordinate-to-coordinate distance L2 has exceeded the first prescribed value (step S170A). When it is determined that coordinate-to-coordinate distance L2 has exceeded the first prescribed value (YES in step S170A), controller 130A detects an abnormality of lighting device 200 and outputs an abnormality detection signal to notification device 300 (step S190). On the other hand, when it is determined that the calculated difference is equal to or smaller than the first prescribed value (NO in step S170A), controller 130A determines whether or not lighting device 200 has been turned off (step S180). When it is determined that lighting device 200 has not been turned off (NO in step S180), the process proceeds to step S160A again. On the other hand, when it is determined that lighting device 200 has been turned off (YES in step S180), the process is returned to the main routine.

As described above, in abnormality detection apparatus 100A according to the second embodiment, controller 130A detects an abnormality of lighting device 200 when the color difference (coordinate-to-coordinate distance L1) between the color information (one example of a physical quantity) detected by color sensor 110A during on state of lighting device 200 and the color information detected by color sensor 110A during off state of lighting device 200 does not fall within the reference range (one example of a criterion). According to abnormality detection apparatus 100A, an abnormality of lighting device 200 can be detected regardless of the time range and the surrounding environment.

In addition, in abnormality detection apparatus 100A according to the second embodiment, controller 130A detects an abnormality of lighting device 200 based on the color difference (coordinate-to-coordinate distance L2) between the color information (one example of a physical quantity) detected by color sensor 110A when lighting device 200 is turned on and the color information continuously detected by color sensor 110A during on state of lighting device 200. According to abnormality detection apparatus 100A, an abnormality of lighting device 200 can be detected simply by monitoring a change in color difference during on state of lighting device 200.

Modification of Second Embodiment

In the second embodiment, the color information is used for both abnormality detection when lighting device 200 is turned on (immediately after lighting device 200 is turned on) (corresponding to steps S100 to S150A in FIG. 9) and abnormality detection during on state of lighting device 200 (corresponding to steps S160A to S180 in FIG. 9). In a modification of the second embodiment, the color information is used for abnormality detection during on state of lighting device 200, whereas the illuminance (corresponding to the first embodiment) of lighting device 200 is used for abnormality detection when lighting device 200 is turned on.

Figure 10:
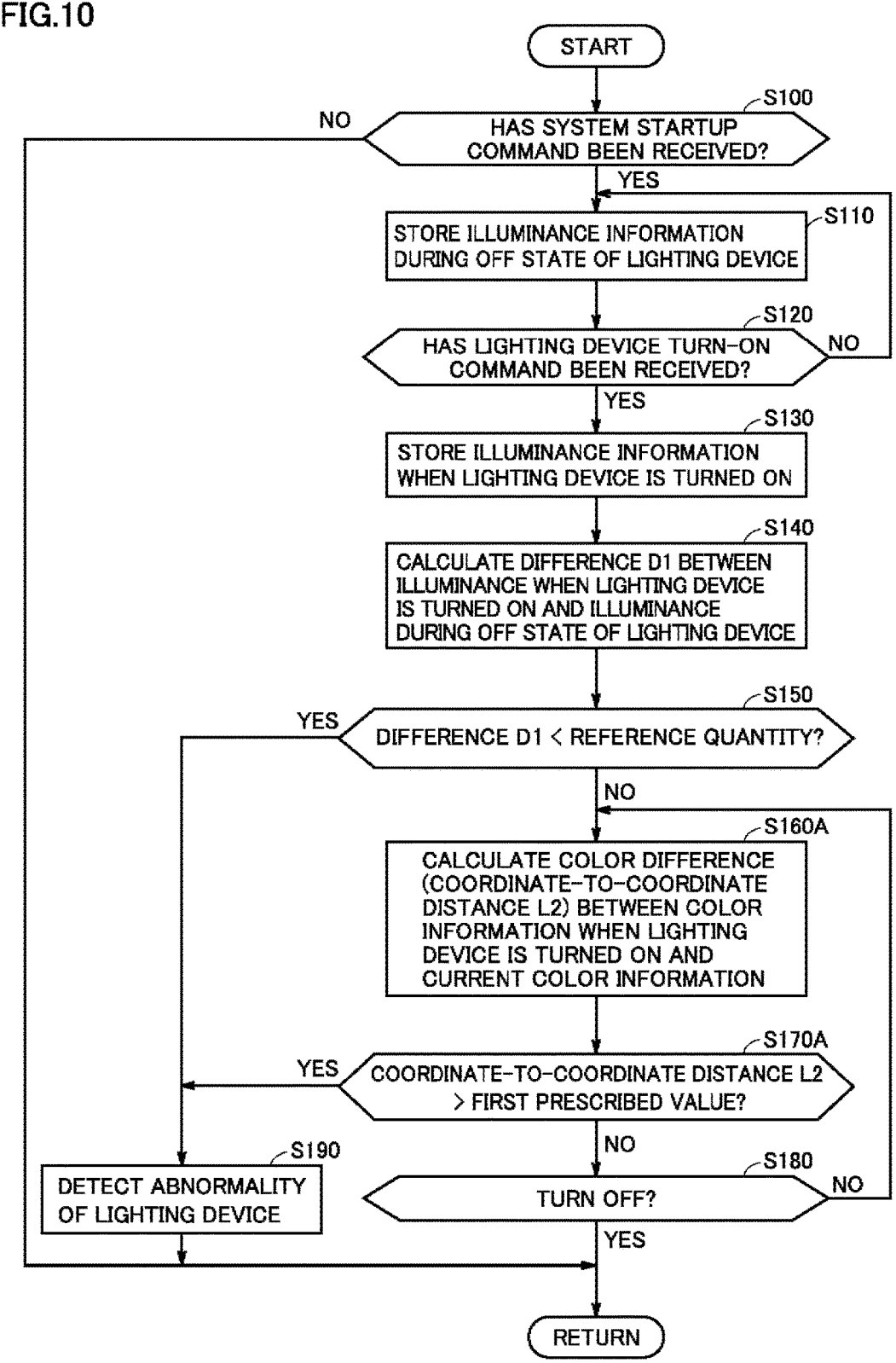
FIG. 10 is a flowchart showing a process procedure for detecting an abnormality of a lighting device in a modification of the second embodiment.

FIG. 10 is a flowchart showing a process procedure for detecting an abnormality of lighting device 200 in the modification of the second embodiment. Referring to FIG. 10, in this flowchart, steps S110A and S130A to S150A in the flowchart in FIG. 9 are replaced with steps S110 and S130 to S150 in the flowchart in FIG. 2, respectively. In abnormality detection apparatus 100A according to the modification of the second embodiment, an abnormality of lighting device 200 can be detected based on the illuminance of lighting device 200 when lighting device 200 is turned on, and an abnormality of lighting device 200 can be detected based on the change in color difference during on state of lighting device 200.

Third Embodiment

In abnormality detection apparatus 100 according to the first embodiment, an abnormality of lighting device 200 is detected using illuminance sensor 110. In abnormality detection apparatus 100A according to the second embodiment, an abnormality of lighting device 200 is detected using color sensor 110A. In an abnormality detection apparatus 100B according to a third embodiment, detection of an abnormality of lighting device 200 using illuminance sensor 110 and detection of an abnormality of lighting device 200 using color sensor 110A are both performed. Since the methods for detecting an abnormality of lighting device 200 using illuminance sensor 110 and color sensor 110A are similar to the methods for detecting an abnormality of lighting device 200 in the first and second embodiments, respectively, description will not be repeated.

When the methods for detecting an abnormality of lighting device 200 in the first and second embodiments are used, an abnormality of lighting device 200 cannot be accurately detected if an abnormality occurs in illuminance sensor 110 or color sensor 110A. Accordingly, in abnormality detection apparatus 100B according to the third embodiment, in addition to detection of an abnormality of lighting device 200 in the first and second embodiments, an abnormality of illuminance sensor 110 or color sensor 110A is detected when the abnormality occurs in illuminance sensor 110 or color sensor 110A. A difference from the first and second embodiments will be mainly described below.

[Overall Configuration of Notification Apparatus]

Figure 11:
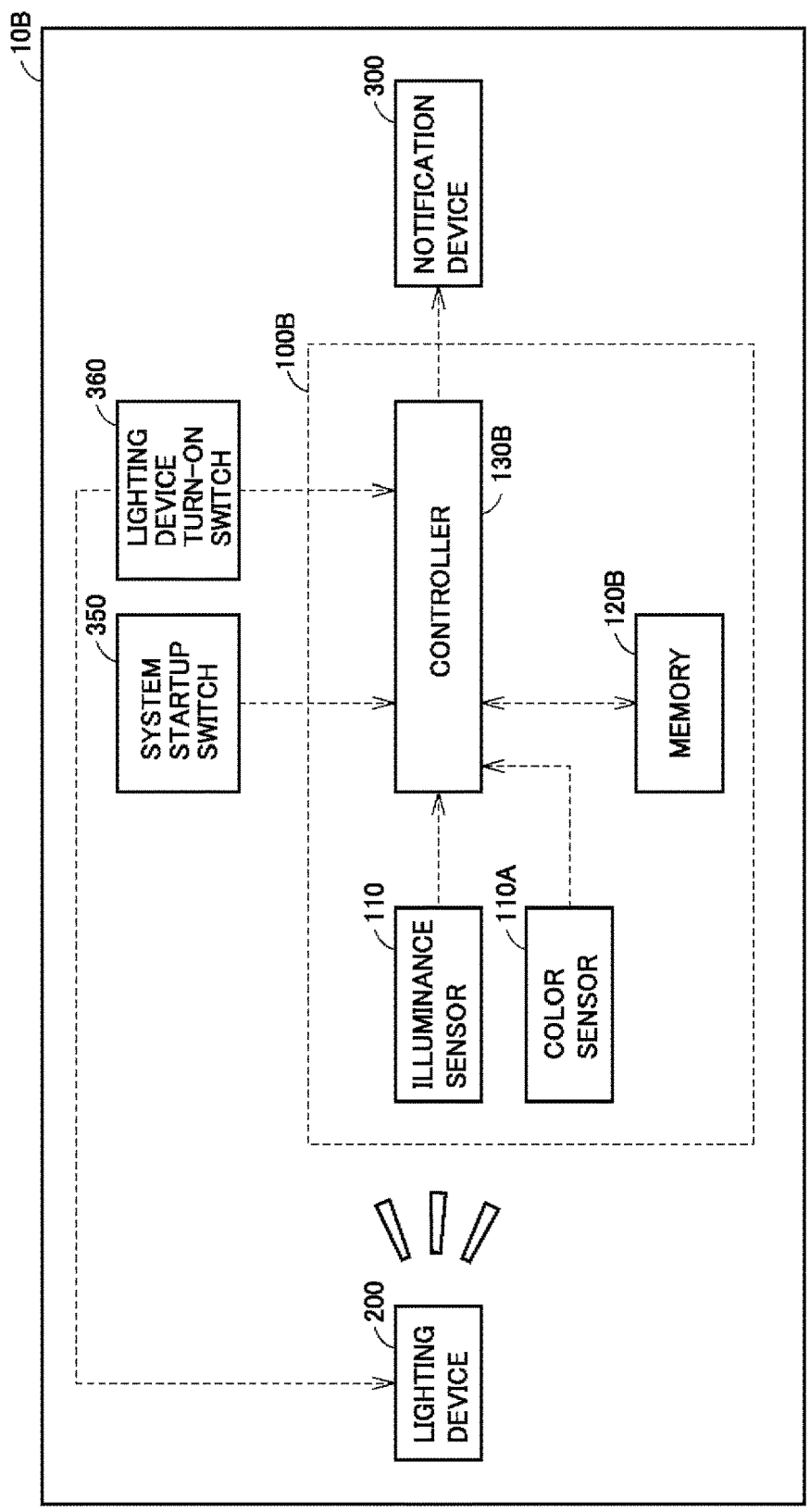
FIG. 11 is an overall configuration diagram of an abnormality detection system to which an abnormality detection apparatus according to a third embodiment is applied.

FIG. 11 is an overall configuration diagram of an abnormality detection system to which an abnormality detection apparatus according to the third embodiment is applied. Referring to FIG. 11, an abnormality notification system 10B includes abnormality detection apparatus 100B instead of abnormality detection apparatus 100 according to the first embodiment or abnormality detection apparatus 100A according to the second embodiment. The remaining configuration is similar to those of the first and second embodiments.

Abnormality detection apparatus 100B detects an abnormality of lighting device 200. Abnormality detection apparatus 100B includes illuminance sensor 110, color sensor 110A, a memory 120B, and a controller 130B.

Illuminance sensor 110 detects an illuminance of lighting device 200. Color sensor 110A detects color information of light emitted from lighting device 200. As described above, in the third embodiment, abnormality detection using the illuminance of lighting device 200 detected by illuminance sensor 110 and abnormality detection using the color information of the light of lighting device 200 detected by color sensor 110A are both performed.

Color sensor 110A can also detect an illuminance in addition to the color information. In the third embodiment, an abnormality of illuminance sensor 110 or color sensor 110A is detected using the information of the illuminance detected by color sensor 110A. A method for detecting an abnormality of illuminance sensor 110 or color sensor 110A will be described in detail below.

Memory 120B stores a reference illuminance and a reference distance used as criteria for detecting an abnormality of lighting device 200. The reference illuminance is used to detect an abnormality of lighting device 200 using illuminance sensor 110 similarly to the first embodiment, and the reference distance is used to detect an abnormality of lighting device 200 using color sensor 110A similarly to the second embodiment.

Controller 130B detects an abnormality of illuminance sensor 110 or color sensor 110A using the illuminance detected by illuminance sensor 110 and the illuminance detected by color sensor 110A. If both illuminance sensor 110 and color sensor 110A are normal, the illuminance detected by illuminance sensor 110 and the illuminance detected by color sensor 110A should be almost the same.

Thus, controller 130B determines that illuminance sensor 110 or color sensor 110A is abnormal, when a difference between the illuminance detected by illuminance sensor 110 and the illuminance detected by color sensor 110A exceeds a second prescribed value. That is, controller 130B performs mutual monitoring of illuminance sensor 110 and color sensor 110A. A value that prevents a difference in detection result caused by an individual difference or the like of illuminance sensor 110 and color sensor 110A from being mistakenly detected as an abnormality of illuminance sensor 110 or color sensor 110A is, for example, predetermined as the second prescribed value.

Thus, according to abnormality detection apparatus 100B, an abnormality of illuminance sensor 110 or color sensor 110A can be detected. Next, a specific process procedure for detecting an abnormality of illuminance sensor 110 or color sensor 110A will be described.

[Process Procedure for Detecting Abnormality of Illuminance Sensor or Color Sensor]

Figure 12:
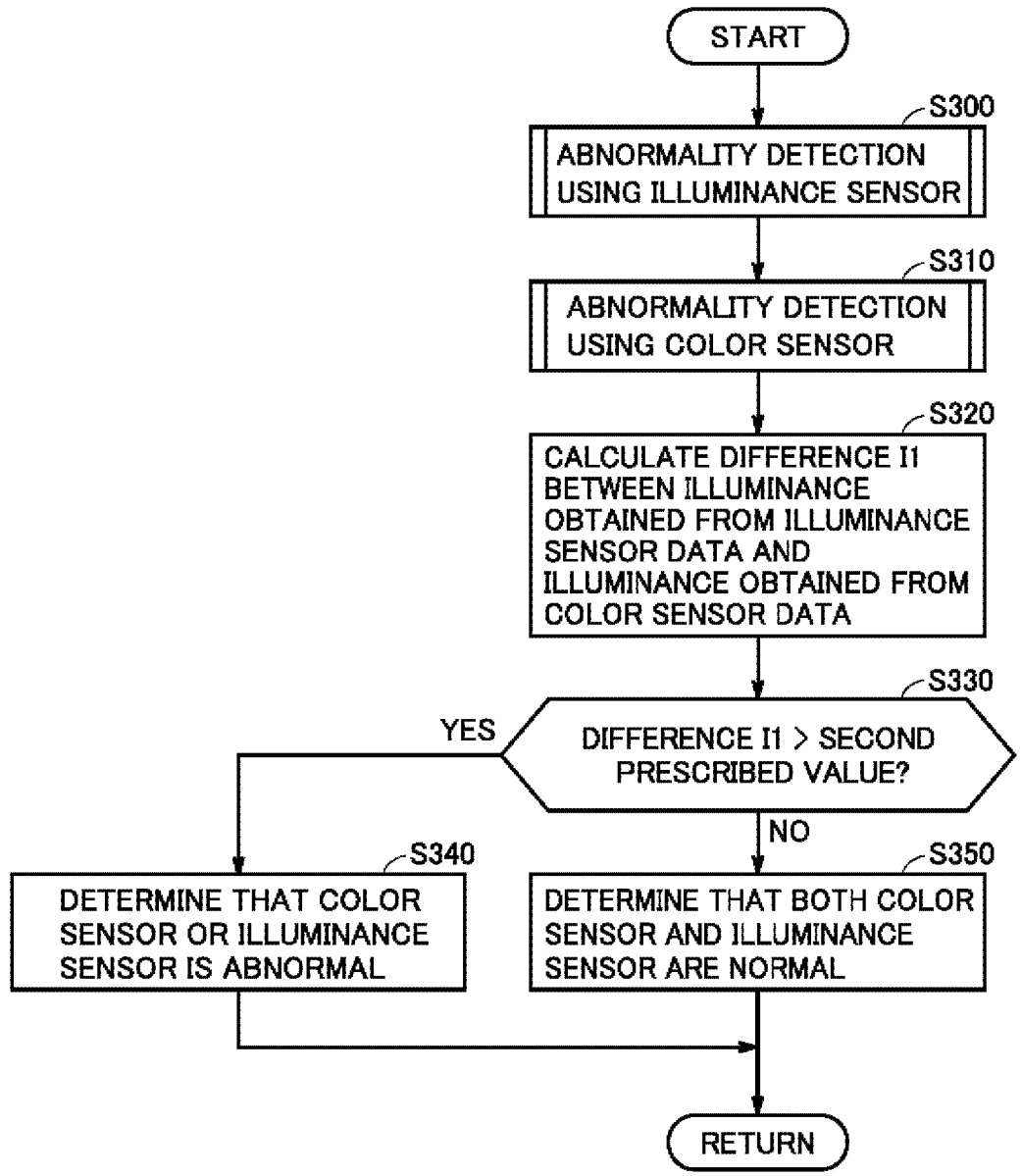
FIG. 12 is a flowchart showing a process procedure for detecting an abnormality of an illuminance sensor or a color sensor.

FIG. 12 is a flowchart showing a process procedure for detecting an abnormality of illuminance sensor 110 or color sensor 110A. Referring to FIG. 12, the process shown in this flowchart is invoked from the not-shown main routine and repeatedly executed in controller 130B during operation of abnormality notification system 10B.

Controller 130B detects an abnormality of lighting device 200 using illuminance sensor 110 (step S300). This corresponds to detection of an abnormality of lighting device 200 described in the first embodiment. As described above, in the process of detecting an abnormality of lighting device 200 using illuminance sensor 110, illuminance information of lighting device 200 is obtained. In the third embodiment, even when an abnormality of lighting device 200 is detected in step S300, the process proceeds to step S310 without returning to the main routine.

Thereafter, controller 130B detects an abnormality of lighting device 200 using color sensor 110A (step S310). This corresponds to detection of an abnormality of lighting device 200 described in the second embodiment. In the process of detecting an abnormality of lighting device 200 using color sensor 110A, illuminance information of lighting device 200 is obtained. In the third embodiment, even when an abnormality of lighting device 200 is detected in step S310, the process proceeds to step S320 without returning to the main routine.

Controller 130B calculates a difference I1 between the illuminance detected by illuminance sensor 110 in step S300 and the illuminance detected by color sensor 110A in step S310 (step S320).

Then, controller 130B determines whether or not difference I1 has exceeded the above-described second prescribed value (step S330). When it is determined that difference I1 has exceeded the second prescribed value (YES in step S330), controller 130B determines that illuminance sensor 110 or color sensor 110A has an abnormality, because difference I1 is not considered to be caused by the individual difference or the like of illuminance sensor 110 and color sensor 110A. On the other hand, when it is determined that difference I1 is equal to or smaller than the second prescribed value (NO in step S330), controller 130B determines that both illuminance sensor 110 and color sensor 110A are normal (step S350). Thereafter, the process is returned to the main routine.

As described above, in abnormality detection apparatus 100B according to the third embodiment, controller 130B determines that illuminance sensor 110 or color sensor 110A is abnormal, when the difference between the illuminance detected by illuminance sensor 110 and the illuminance detected by color sensor 110A exceeds the second prescribed value. According to abnormality detection apparatus 100B, an abnormality of illuminance sensor 110 or color sensor 110A can be detected, and as a result, an abnormality of lighting device 200 can be accurately detected.

Other Embodiments

As mentioned above, the first to third embodiments have been described as the embodiments of the present invention. However, the present invention is not necessarily limited to the first to third embodiments. One example of the other embodiments will now be described.

In the first and second embodiments, the predetermined fixed values are used as the reference quantity and the first prescribed value. However, the reference quantity and the first prescribed value do not necessarily need to be the fixed values. For example, the present invention may be configured such that the reference quantity and the first prescribed value are updated through the Internet. For example, the reference quantity and the first prescribed value obtained through the Internet are generated using big data. A large number of data when lighting device 200 in abnormality notification systems 10 and 10A breaks down is collected through the Internet, and the optimum reference quantity and first prescribed value are sequentially updated based on the collected large number of data. Abnormality notification systems 10 and 10A can obtain the latest reference quantity and first prescribed value as appropriate and thereby detect an abnormality of lighting device 200 more accurately.

It should be understood that the embodiments disclosed herein are illustrative and non-restrictive in every respect. The scope of the present invention is defined by the terms of the claims, rather than the description above, and is intended to include any modifications within the scope and meaning equivalent to the terms of the claims.

REFERENCE SIGNS LIST 10, 10A, 10B abnormality notification system; 100, 100A, 100B abnormality detection apparatus; 110 illuminance sensor; 110A color sensor; 120, 120A, 120B memory; 130, 130A, 130B controller; 200 lighting device; 300 notification device; 350 system startup switch; 360 lighting device turn-on switch.

The invention claimed is:

1. An abnormality detection apparatus configured to detect an abnormality of a lighting device, the abnormality detection apparatus comprising:
   a sensor configured to detect a physical quantity about the lighting device;
   a memory configured to store a criterion for detecting the abnormality; and
   a control device configured to detect the abnormality based on the criterion and a difference between a physical quantity detected by the sensor during on state of the lighting device after receiving a turn-on command to turn on the lighting device and a physical quantity detected by the sensor during off state of the lighting device before receiving the turn-on command.

2. The abnormality detection apparatus according to claim 1, wherein
   the sensor is configured to continuously detect the physical quantity during on state of the lighting device, and
   the control device is configured to detect the abnormality based on a difference between a physical quantity detected by the sensor when the lighting device is turned on and each physical quantity continuously detected by the sensor during on state of the lighting device.

3. The abnormality detection apparatus according to claim 2, wherein
   the control device is configured to detect the abnormality, when the difference between the physical quantity detected by the sensor when the lighting device is turned on and each physical quantity continuously detected by the sensor during on state of the lighting device exceeds a first prescribed value.

4. The abnormality detection apparatus according to claim 2, wherein
   the control device is configured to detect the abnormality, when a frequency exceeds a prescribed frequency, the frequency being a frequency with which the difference between the physical quantity detected by the sensor when the lighting device is turned on and each physical quantity continuously detected by the sensor during on state of the lighting device exceeds a first prescribed value.

5. The abnormality detection apparatus according to claim 1, wherein the sensor is an illuminance sensor, and the physical quantity is an illuminance.

6. The abnormality detection apparatus according to claim 1, wherein the sensor is a color sensor, and the physical quantity is color information.

7. A notification apparatus comprising:
   the abnormality detection apparatus as recited in claim 1; and
   a notification device configured to provide a notification for urging a user to replace or repair the lighting device,
   the notification device being configured to provide the notification in response to detection of the abnormality by the control device.

8. The abnormality detection apparatus according to claim 1, wherein
   the sensor includes an illuminance sensor configured to detect an illuminance of the lighting device and a color sensor configured to detect an illuminance and color information of the lighting device,
   the control device being configured to determine that the illuminance sensor or the color sensor is abnormal, when a difference between the illuminance detected by the illuminance sensor and the illuminance detected by the color sensor exceeds a second prescribed value.

9. The abnormality detection apparatus according to claim 1 wherein
   the abnormality detection apparatus further comprises a turn-on switch configured to turn on or off the lighting device,
   the control device is configured to receive the turn-on command through the turn-on switch.

* * * * *